(12) United States Patent
Wolf

(10) Patent No.: US 8,932,472 B2
(45) Date of Patent: Jan. 13, 2015

(54) SEPARATOR SYSTEM AND RELATED METHODS

(75) Inventor: Mark E. Wolf, Katy, TX (US)

(73) Assignee: National Oilwell Varco, L.P., Houston, TX (US)

(*) Notice: Subject to any disclaimer, the term of this patent is extended or adjusted under 35 U.S.C. 154(b) by 572 days.

(21) Appl. No.: 13/280,507

(22) Filed: Oct. 25, 2011

(65) Prior Publication Data

US 2013/0098850 A1 Apr. 25, 2013

(51) Int. Cl.
| | |
|---|---|
| *B01D 17/038* | (2006.01) |
| *B01D 17/12* | (2006.01) |
| *B04C 5/00* | (2006.01) |
| *B04C 9/00* | (2006.01) |
| *C02F 1/38* | (2006.01) |
| *B01D 17/02* | (2006.01) |
| *B01D 19/00* | (2006.01) |

(52) U.S. Cl.
CPC ............. *B01D 17/0217* (2013.01); *B01C 5/00* (2013.01); *B01D 17/12* (2013.01); *B01D 19/0057* (2013.01); *B04C 9/00* (2013.01); *B04C 2009/005* (2013.01)
USPC ............. 210/788; 210/512.1; 210/416.1; 417/321

(58) Field of Classification Search
USPC .............. 210/788, 512.1, 416.1; 417/321
See application file for complete search history.

(56) References Cited

U.S. PATENT DOCUMENTS

| | | | |
|---|---|---|---|
| 2,360,355 A | 10/1944 | McBride et al. | |
| 2,622,735 A | 12/1952 | Criner | |
| 2,671,560 A | 3/1954 | Fontein et al. | |
| 2,734,630 A | 2/1956 | Van Der Wal et al. | |
| 2,765,918 A | 10/1956 | Fontein et al. | |
| 2,956,679 A | 10/1960 | Hoffmann | |
| RE25,099 E | 12/1961 | Hoffman | |
| 3,061,994 A | 11/1962 | Mylting | |
| 3,104,961 A | 9/1963 | Westlin | |
| 3,261,467 A | 7/1966 | Wikdahl | |
| 3,371,794 A | 3/1968 | Johnson | |
| 3,386,588 A | 6/1968 | Ades | |
| 3,415,374 A | 12/1968 | Wikdahl | |
| 3,425,192 A | 2/1969 | Davis | |
| 3,486,618 A | 12/1969 | Wikdahl | |
| 3,543,931 A | 12/1970 | Restatter | |
| 3,598,731 A | 8/1971 | Frykhult et al. | |
| 3,861,532 A | 1/1975 | Skardal | |
| 3,940,331 A | 2/1976 | Rastatter | |

(Continued)

FOREIGN PATENT DOCUMENTS

| | | |
|---|---|---|
| EP | 0161813 A1 | 11/1985 |
| EP | 1393812 A1 | 3/2004 |

(Continued)

OTHER PUBLICATIONS

International Search Report for PCT/EP2012/071183, Jan. 2, 2013.*

(Continued)

*Primary Examiner* — David A Reifsnyder
(74) *Attorney, Agent, or Firm* — Winston & Strawn LLP

(57) ABSTRACT

A separator system and method are provided in which the separator has two outlets for different components of mixed fluid. An energy harvester is provided on one of the outlets, wherein harvested energy is transferred to a pump located on an inlet of the separator. As a result, the differential pressure across the separator is increased.

26 Claims, 3 Drawing Sheets

(56) References Cited

U.S. PATENT DOCUMENTS

| | | |
|---|---|---|
| 3,959,123 A | 5/1976 | Wikdahl |
| 3,984,308 A | 10/1976 | Rastatter |
| 4,123,364 A | 10/1978 | Mozley |
| 4,148,721 A | 4/1979 | Brown et al. |
| 4,148,723 A | 4/1979 | Mozley |
| 4,208,270 A | 6/1980 | Grieve et al. |
| 4,285,706 A | 8/1981 | Dehne |
| 4,297,111 A | 10/1981 | Ross |
| 4,378,289 A | 3/1983 | Hunter |
| 4,426,283 A | 1/1984 | Fecske |
| 4,437,984 A | 3/1984 | King et al. |
| 4,537,608 A | 8/1985 | Koslow |
| 4,650,584 A | 3/1987 | Macierewicz |
| 4,691,510 A * | 9/1987 | Taylor et al. ............... 60/39.094 |
| 4,783,272 A | 11/1988 | Patterson |
| 4,844,812 A | 7/1989 | Haynes et al. |
| 4,863,500 A | 9/1989 | Rombout et al. |
| 4,948,517 A | 8/1990 | Young et al. |
| 5,009,785 A | 4/1991 | Webb |
| 5,017,288 A | 5/1991 | Thew et al. |
| 5,071,557 A | 12/1991 | Schubert et al. |
| 5,178,648 A | 1/1993 | Kalen et al. |
| 5,194,150 A | 3/1993 | O'Brien et al. |
| 5,336,410 A | 8/1994 | O'Brien et al. |
| 5,337,899 A | 8/1994 | Andersson et al. |
| 5,388,708 A | 2/1995 | Bouchillon et al. |
| 5,447,632 A | 9/1995 | Andersson |
| 5,499,720 A | 3/1996 | Bouchillon et al. |
| 5,616,244 A | 4/1997 | Seureau et al. |
| 5,667,686 A | 9/1997 | Schubert et al. |
| 5,965,022 A | 10/1999 | Gould et al. |
| 5,980,639 A | 11/1999 | Trickey et al. |
| 6,129,217 A | 10/2000 | Trickey et al. |
| 6,800,208 B2 | 10/2004 | Bolman |
| 7,011,219 B2 | 3/2006 | Knox-Holmes et al. |
| 8,020,707 B2 | 9/2011 | Kim et al. |
| 2007/0215541 A1 | 9/2007 | Kampfer |
| 2008/0099410 A1 | 5/2008 | Sprague |
| 2009/0100810 A1 | 4/2009 | Smith |
| 2009/0231367 A1 | 9/2009 | Tsuchiya |
| 2010/0237023 A1 | 9/2010 | Sprague |
| 2011/0259819 A1 | 10/2011 | Beedie et al. |

FOREIGN PATENT DOCUMENTS

| | | |
|---|---|---|
| FR | 2389418 | 12/1978 |
| GB | 2362118 | 11/2001 |
| WO | WO2009016332 A1 | 2/2009 |
| WO | WO2010005312 A1 | 1/2010 |
| WO | WO2011081529 A1 | 7/2011 |
| WO | WO2013060796 A1 | 5/2013 |

OTHER PUBLICATIONS

International Preliminary Report on Patentabillity for PCT/EP2012/071183, Apr. 29, 2014.*

* cited by examiner

SEPARATOR SYSTEM AND RELATED METHODS

FIELD OF THE INVENTION

The present invention relates to a cyclone apparatus for separating a mixture of two fluid components. In particular, but not exclusively, the present invention relates to a cyclone apparatus for separating two immiscible liquids, such as oil and water.

BACKGROUND

In oil production processes, particularly off-shore oil production processes, a mixture of oil and water is often recovered. The water recovered in this way is unwanted and needs to be disposed of. However, it is not environmentally appropriate to dispose of the water while it is still contaminated with oil. Therefore, there is a need to separate the oil from the water.

In practice, there are certain limitations on the apparatus that can be used for this separation. In particular, the constraints of offshore oil production, such as the size of the offshore platform, require a separation apparatus that is both effective and relatively compact. Over recent decades, cyclone separators have been developed to carry out this task.

The operation of a cyclone separator can be described as follows. A fluid (in this case, a mixture of oil and water) enters a cyclone tangentially, causing the fluid inside the cyclone to spin. This creates a radial force that directs the heavier phase (in this case, the water) towards the edges of the cyclone, thus retaining the lighter phase (in this case, the oil) in the centre of the cyclone. The two phases of oil and water can then be extracted from the cyclone separately. The water is extracted via a clean water outlet while the oil is extracted via a waste water reject line.

Compared with alternatives such as settling or skim tanks, a cyclone separator yields a much faster separation within a smaller space. This is because the gravitational force at work in settling or skim tanks is replaced by radial forces in the cyclone of a far higher magnitude. These high forces mean that cyclones are insensitive to motion and orientation, making them particularly ideal for offshore applications in the oil industry.

Nevertheless, there remain difficulties in implementing effective cyclone separators at reasonable cost with required reliability. For example, it is necessary to apply a back pressure to the cyclone from the clean water outlet in order to ensure that the oily waste product is forced through the reject line. This is achieved using a control valve which is placed on the water outlet across which a pressure differential is established and which dissipates pressure energy through turbulent friction.

The implementation of a control valve creates a number of complications in the effective performance of the cyclone. For example, it is often appropriate to have further separation processes downstream of the cyclone to separate out any residual oil in the clean water outlet. The efficiency of these downstream processes typically depends strongly on the size of the oil droplets within the mixture. However, the action of the control valve introduces turbulence into the outlet which causes shear forces that tend to reduce the average oil droplet size.

Another complication arises when trying to control the overall flow of liquid through the system. For example, the control valve may be adjusted to change the flow of liquid to processes upstream and/or downstream of the cyclone. While it may be relatively simple to use an adjustable valve for this purpose, complications arise in that it is typically desired to extract a constant ratio of liquid through the water outlet and the reject line. In particular, it is undesirable to remove too high a proportion of liquid through the water outlet, since this is liable to cause contamination, while it is also undesirable to remove too small a proportion of liquid through this route since this would increase the amount of water flowing through the reject line.

In order to maintain a constant volumetric ratio of liquid through the water outlet and the reject line, it has been proposed to place an additional outlet valve on the reject line. Moreover, a control mechanism is introduced so that the control of the control valve on the water outlet and the additional control valve on the reject line are linked so as to ensure the necessary constant ratio. However, these additional parts carry an expense and risk of failure which is undesirable.

There is an ongoing desire to improve separation apparatuses for use in offshore oil operations and elsewhere. In particular, there is a desire to increase the efficiency of separation while simultaneously retaining reliability and avoiding prohibitive expense.

SUMMARY OF THE INVENTION

According to a first aspect of the present invention, there is provided a separator system for separating a mixture of a first fluid and a second fluid, comprising: a separator comprising a separating chamber, an inlet, a first outlet for discharge of the first fluid from the separating chamber and a second outlet for discharge of the second fluid from the separating chamber; a pump coupled to the inlet; an energy harvester adapted to harvest pressure energy from the first fluid in the first outlet; and an energy transfer mechanism adapted to transfer the harvested energy to the pump.

The present invention can enable a back-pressure to be applied at the first outlet by the energy harvester, while simultaneously using the pressure drop created across the harvester to obtain energy that can be used to drive the pump coupled to the inlet. As such, the input pressure can be increased, thereby increasing the efficiency and throughput of the separator. In particular, the present invention may be understood to recycle energy from the outlet to the inlet that would otherwise be lost if conventional mechanisms such as valves were used.

In exemplary embodiments, the energy harvester is arranged to convert pressure energy into mechanical energy. This may find particular advantages where, for example, the pump is mechanically actuated. In such an arrangement, the mechanical energy harvested by the energy harvester may be directly transmitted to the pump. In other circumstances, the energy harvester may be arranged to convert pressure energy to electrical energy, for example.

In exemplary embodiments, the energy harvester comprises a rotating shaft. More specifically, the energy harvester may comprise a progressive cavity pump. In this arrangement, the fluid in the first fluid outlet causes the rotating shaft of the progressive cavity pump to rotate as it passes through, thus converting pressure energy in the fluid to mechanical energy.

Such an arrangement finds particular advantages when the pump also comprises a rotating shaft. For example, the pump may also be a progressive cavity pump. The rotational movement generated in the progressive cavity pump of the energy harvester may therefore be very simply connected to the rotating shaft of the pump, which can act as a drive shaft. In this way, the energy obtained by the energy harvester can be efficiently applied to the pump.

In an exemplary embodiment, the energy transfer mechanism is arranged to ensure a fixed ratio of fluid passes through the pump and the energy harvester. Since this will fix the ratio of the fluid passing through the inlet and the first outlet, it will also have the effect of controlling the proportion of fluid in the second outlet. In this way, one can avoid the need for a control system or the like to control the second outlet while retaining desired proportions of liquid in the first and second outlets.

The energy transfer mechanism may, for example, comprise a torque transfer device. For example, where the pump and the energy harvester both comprise rotating shafts, the energy transfer mechanism may be a gearing system which controls the relative rates of rotation of these shafts. This is a mechanically simple, and thus reliable and inexpensive, approach to ensuring fixed ratios of fluids throughout the separator.

In an exemplary embodiment, the separator is a cyclone separator, more specifically a hydrocyclone separator. Cyclone separators are particularly efficient and compact. Moreover, the provision of an energy harvester is particularly beneficial in the context of a cyclone separator, providing a useful back pressure to ensure that fluid is output through both outlets.

In exemplary embodiments, the first fluid has a greater density than the second fluid. Moreover, the first and second fluids may be liquids, and in particular the first fluid may be water while the second fluid may be oil.

According to a second aspect of the present invention, there is provided a method of separating a mixture of a first fluid and a second fluid, comprising the steps of: pumping the mixture into a separator using a pump; separating the mixture of the first fluid and the second fluid in a separator; discharging the first fluid through a first outlet of the separator; discharging the second fluid through a second outlet of the separator; harvesting pressure energy of the first fluid in the first outlet; and transferring the harvested energy to the pump.

Exemplary features of the first aspect of the invention may be equally applied to the second aspect of the invention.

BRIEF DESCRIPTION OF DRAWINGS

An exemplary embodiment of the present invention will now be described, by reference to the accompanying drawings, in which.

DETAILED DESCRIPTION OF THE INVENTION

Illustrative embodiments and related methodologies of the invention are described below as they might be employed to provide a separator system. In the interest of clarity, not all features of an actual implementation are described in this specification. It will of course be appreciated that in the development of any such actual embodiment, numerous implementation specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments of the invention will become apparent from consideration of the following description and drawings.

Figure 1:
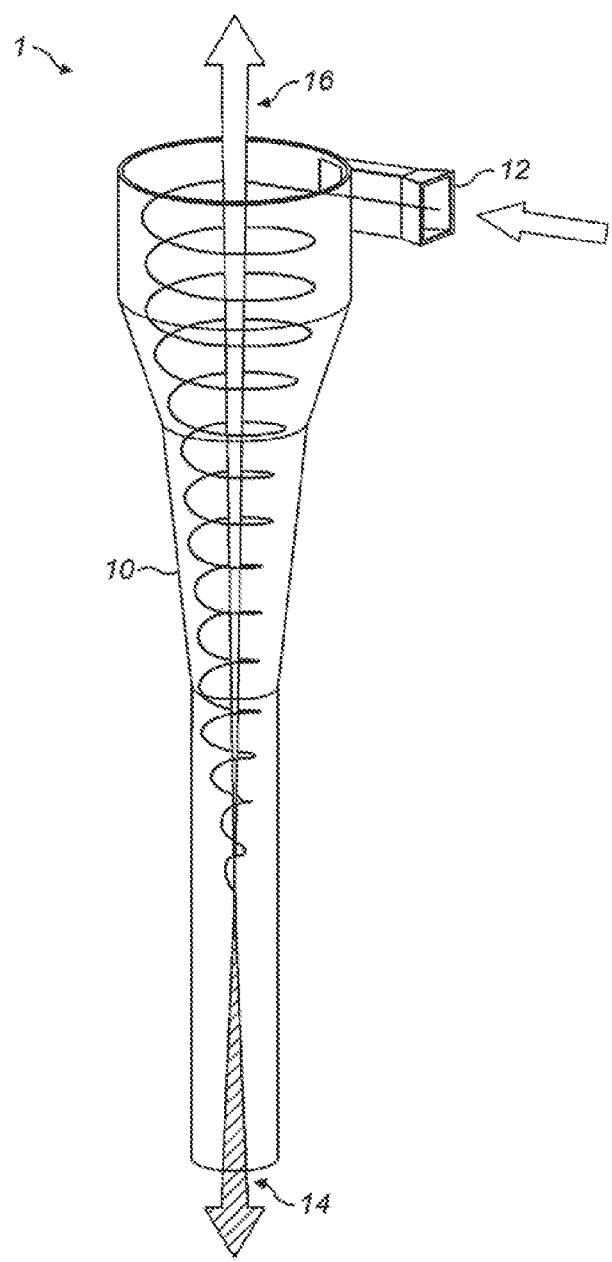
FIG. 1 illustrates a cyclone separator used in accordance with an exemplary embodiment of the present invention.

Referring to FIG. 1, a cyclone separator 1 is shown comprising a separation chamber 10, and inlet 12, a water outlet 14 and a reject line 16. The water outlet 14 and the reject line 16 are illustrated figuratively, with arrows indicating the direction of movement of fluid through these features, but one ordinarily skilled in the art having the benefit of this disclosure appreciates that in practice they are implemented using physical pathways.

The cyclone separator 1 is a de-oiling hydrocyclone separator. As such, the cyclone separator 1 is designed to separate oil from water by inducing a cyclone within the separation chamber 10.

Figure 2:
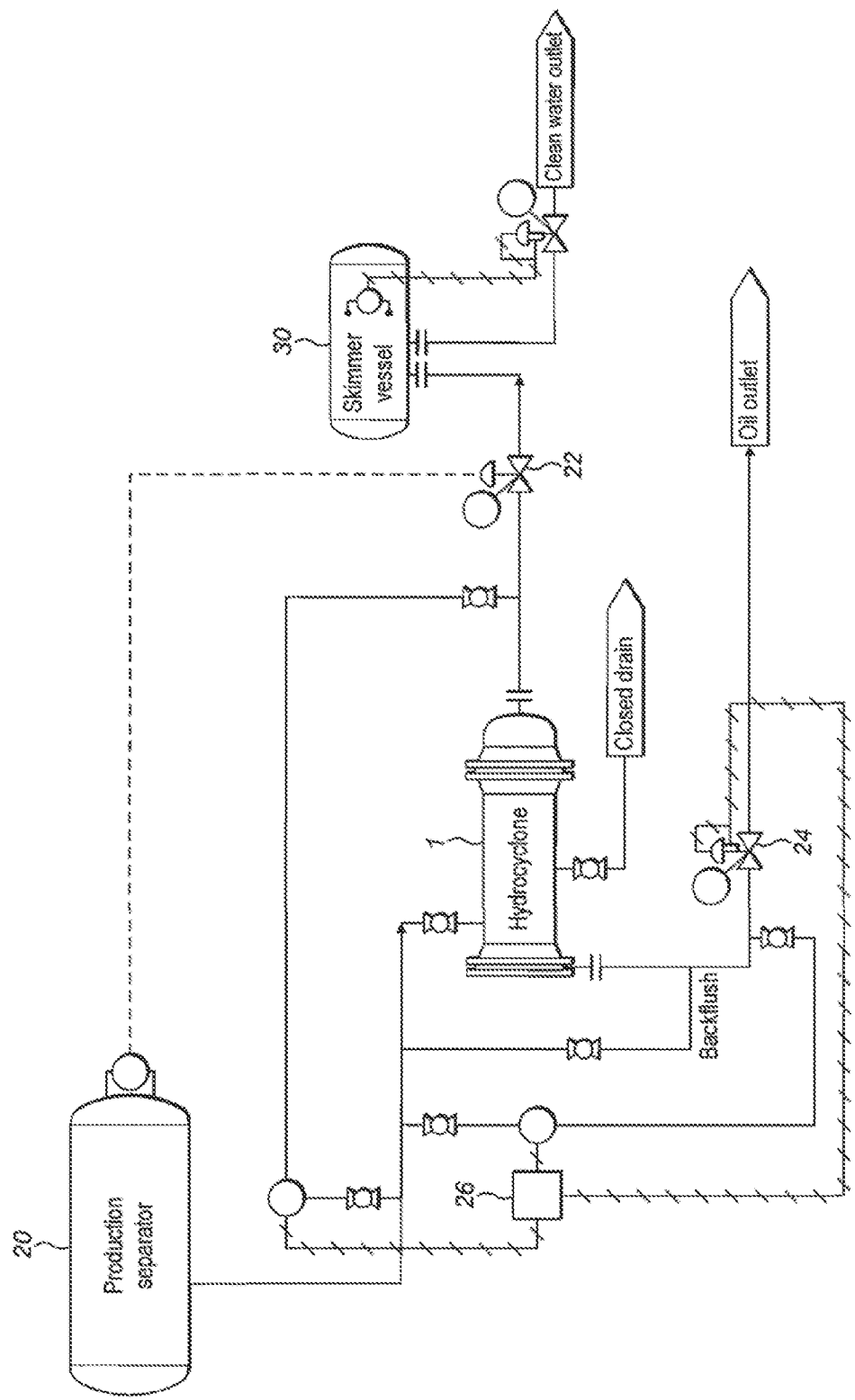
FIG. 2 illustrates a prior art separator system.

The position of a cyclone separator 1 within a known separation system is shown in FIG. 2. In FIG. 2, the separation system comprises an initial fluid store 20, which contains a mixture of oil and water. The fluid store 20 is coupled to the cyclone separator 1. A clean water control outlet valve 22 is provided on a first outlet (the water outlet 14) of the cyclone separator, while a reject outlet control valve is provided on a second outlet (the reject line 16) of the cyclone separator. A pressure ratio controller 26 is coupled to both the clean water outlet control valve 22 and the reject outlet control valve 24.

FIG. 2 also shows downstream treatment 30. This may be an apparatus for carrying out a technique such as induced gas flotation, filtration or absorption. This can be used to further purify the output of the cyclone separator 1 which passes through the water outlet 14.

In use, a mixture of oil and water is pumped from the fluid store 20 into the cyclone separator 1. On entering the cyclone separator 1, the mixture is made to rotate in the separation chamber 10 creating a cyclonic effect. As a result, the more dense liquid (in this case water) is forced towards the edge of the separation chamber 10, while the less dense liquid (in this case oil) is retained in the axial centre of the separation chamber 10. As a result, the water and oil are separated and can be extracted from the water outlet 14 and the reject line 16 respectively.

The fluid exiting from the water outlet 14 reaches the clean water valve 22. This valve causes some back-pressure in the system, ensuring that oil is pushed through the reject line 16 where it encounters the reject outlet control valve 24.

So, the mixture of oil and water that was initially held in the fluid store 20 has been divided into two components, that passing through the water outlet 14 and that passing through the reject line 16. Ideally, these components would be pure water and pure oil respectively. However, in practice there may be a mixture of fluids in each component. One reason for this is that the proportions of oil and water in the initial mixture must be reflected in the proportions of the total fluid which is extracted through the different outlets. For example, if the initial mixture contains only 20% oil, but the reject line 16 removes 50% of the fluid from the separator, it is clear that the component in the reject line 16 will contain some water.

The proportions of fluids in the reject line 16 and the water outlet 14 will depend on the pressure in those outlets and thus on the action of the reject outlet control valve 24 and the clean water control valve 22. These valves must be controlled to maintain a constant ratio of the differential pressure between the inlet and the water outlet 14 to the differential pressure between the inlet 12 and the reject line 16. This is particularly important when the flow rate from the fluid store 20 is variable such that fixed settings for the valves may not result in this ratio being constant. The necessary control is enforced by the pressure ratio controller 26.

Once fluid has passed through the clean water control valve 22, it reaches the downstream treatment 30, in which one or more further steps of purification may be carried out to remove impurities from the water.

Figure 3:
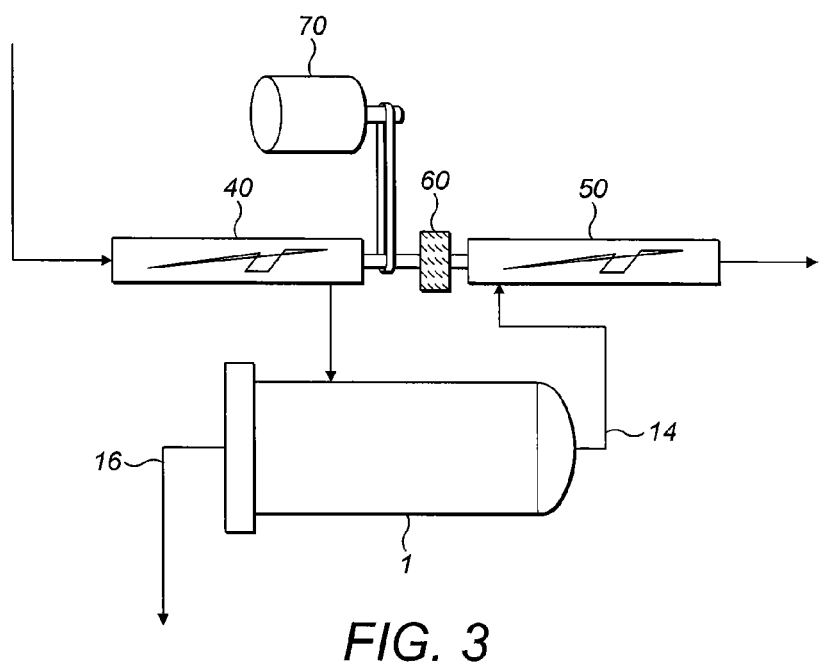
FIG. 3 illustrates a separator system according to an exemplary embodiment of the present invention.

A separator system in accordance with an exemplary embodiment of the present invention is illustrated in FIG. 3. The separator 1 shown in FIG. 3 may take the form of the separator 1 illustrated in FIG. 1, and in particular in the exemplary embodiment is a cyclone separator. As will be explained in greater detail below, exemplary embodiments described herein avoid the need for the clean water outlet valve 22 and the reject outlet control valve 24. Moreover, this exemplary embodiment removes the requirement for a pressure ratio controller 26. In addition to this, in comparison with the system shown in FIG. 2, this exemplary embodiment offers an improved pressure differential between the inlet 12 of the separator 1 and the water outlet 14.

In particular, according to this exemplary embodiment, a pump 40 is provided coupled to the inlet 12 of the separator 1. Moreover, an energy harvester 50 is provided coupled to the water outlet 14 of the separator 1. The energy harvester turns pressure energy in the water outlet 14 into mechanical energy. An energy transfer mechanism 60 is provided to apply this energy to the pump 40.

A drive mechanism 70 is further provided. In this exemplary embodiment, the drive mechanism is coupled to the energy transfer mechanism 60, but it may be coupled to other parts of the system as appropriate. For instance, the drive mechanism may be coupled to the pump 40 or the energy harvester 50.

In this exemplary embodiment, the energy harvester 50 is a progressive cavity motor. Accordingly, as fluid passes through the energy harvester 50, this causes rotation of a rotating shaft. In other embodiments, the energy harvester 50 may take other forms. Examples of other energy harvesters which may convert pressure energy (hydraulic energy) into mechanical energy include turbines, gear motors or reciprocating hydraulic engines, as would be readily understood by those ordinarily skilled in the art having the benefit of this disclosure.

Similarly, in the exemplary embodiment, the pump 40 is a progressive cavity pump. This means that fluid can be forced through the pump 40 by rotation of a rotating shaft (or drive shaft). In other embodiments, the pump 40 may take other forms, such as a turbine, a gear pump or a reciprocating hydraulic pump, as would be readily understood by those ordinarily skilled in the art having the benefit of this disclosure.

The energy transfer mechanism 60 of the exemplary embodiment can be considered a torque transfer device, arranged to transfer torque from the rotating shaft of the energy harvester 50 to the rotating shaft of the pump 40. The energy transfer mechanism 60 is arranged to ensure a fixed ratio between the speeds of rotation of the rotating shafts of the pump 40 and the energy harvester 50. Accordingly, a fixed volumetric ratio of fluid passes through the pump 40 and the energy harvester 50. As a result, the ratio of fluid through the inlet 12 and the water outlet 14 is fixed, which in turn fixes the relative proportion of fluid which passes through the reject line 16. As mentioned above, this obviates the need for the clean water control valve 22, the reject outlet control valve 24 and the pressure ratio controller 26.

As an alternative to controlling the speeds of rotation of the pump 40 and the energy harvester 50, or in addition to such control, the ordinarily skilled in the art having the benefit of this disclosure realizes different volumetric capacities for the pump 40 and the energy harvester 50 may be fixed. For example, the pump 40 and the energy harvester 50 may operate at the same speed but result in differential fluid flow rates. In this case, the volumetric capacity of the two devices would be set at the desired ratio. Examples include a piston, plunger, or diaphragm arrangement where both the pump 40 and the energy harvester 50 have the same piston and cylinder diameter, and are connected to a common crankshaft acting as the energy transfer mechanism 60. In this case, the volumetric difference in flow rate through the pump 40 and the energy harvester 50 may be achieved by mounting connecting rods at different radius lengths from the centre of the shaft such that the energy harvester 50 has a shorter stroke length with smaller volumetric displacement than the pump 40. In an alternative, the radius lengths and thus stroke length may be identical, while the piston and cylinder diameter is different for the pump 40 and the energy harvester 50.

In this exemplary embodiment, the energy transfer mechanism 60 is a mechanical gear reducer. However, alternative implementations are envisaged, such as a sheave and belt system, a chain and sprocket, or an electronic rotational speed controller.

The drive mechanism 70 of this exemplary embodiment comprises an electronic motor and electronic speed control (for example, a variable frequency drive). The electronic motor is coupled to the energy transfer mechanism 60 and can thus control the rate of fluid flow through the pump 40 and the energy harvester 50. As mentioned above, the coupling of the pump 40 and the energy harvester 50 via the energy transfer mechanism 60 ensures that varying the rate of flow through the system does not vary the proportions of fluid in each of the inlet 12, the water outlet 14 and the reject line 16. Using the drive mechanism 70 to control the overall flow rate avoids the need to control the flow rate using an outlet valve or the like.

The advantages of the present invention are not limited to the increase in the pressure differential across the separator 1 due to the feedback between the energy harvester 60 and the pump 40, or to the removal of a requirement for a water outlet valve 22, a reject outlet control valve 24 or a pressure ratio controller 26, but can also extend to an increased efficiency for the downstream treatment 30. The efficiency of the downstream treatment 30 is often related to the size of the remaining oil droplets in the fluid. Whereas the water outlet control valve 22 of FIG. 2 is likely to significantly reduce the average droplet size due to the shear forces and turbulence caused in the fluid by such a valve, this effect is smaller using an energy harvester 50. In particular, the progressive cavity motor of this exemplary embodiment introduces minimal such forces into the fluid and thus does not reduce droplet size significantly. Indeed, the energy harvester 50 may even increase the average droplet size by causing low energy mixing and increased contact with solid surfaces, which acts to encourage coalescence. As a result, the downstream treatment 30 is found to be more effective.

As mentioned above, various aspects of this exemplary embodiment may be modified as required. For example, the form of the pump 40 and the energy harvester 50 may be varied according to requirements.

An exemplary embodiment of the present invention provides a separator system for separating a mixture of a first fluid and a second fluid, comprising: a separator comprising a separating chamber, an inlet, a first outlet for discharge of the first fluid from the separating chamber and a second outlet for discharge of the second fluid from the separating chamber; a pump coupled to the inlet; an energy harvester adapted to harvest pressure energy from the first fluid in the first outlet; and an energy transfer mechanism adapted to transfer the harvested energy to the pump. In another exemplary embodiment, the separator is a cyclone separator. In yet another, the first fluid has a greater density than the second fluid. In another, the first fluid is water and the second fluid is oil.

In yet another, the energy harvester is arranged to convert pressure energy into mechanical energy. In another, the energy harvester comprises a progressive cavity motor. In yet another exemplary embodiment, the pump comprises a progressive cavity pump. In another, the energy transfer mechanism is arranged to ensure a fixed ratio of fluid passes through the pump and the energy harvester. In yet another, the energy transfer mechanism comprises a torque transfer device. In another, the separator system further comprises a drive mechanism coupled to at least one of the pump, the energy harvester or the energy transfer mechanism.

An exemplary methodology of the present invention provides a method of separating a mixture of a first fluid and a second fluid, the method comprising the steps of: (a) pumping the mixture into a separator using a pump; (b) separating the mixture of the first fluid and the second fluid in the separator; (c) discharging the first fluid through a first outlet of the separator; (d) discharging the second fluid through a second outlet of the separator; (e) harvesting pressure energy of the first fluid in the first outlet using an energy harvester; and (f) transferring the harvested energy to the pump using an energy transfer mechanism. In another, the separator is a cyclone separator. In yet another, the first fluid has a greater density than the second fluid. In another, the first fluid is water and the second fluid is oil. In yet another, the energy harvester is arranged to convert pressure energy into mechanical energy. In yet another, the energy harvester comprises a progressive cavity motor.

In another exemplary methodology, the pump comprises a progressive cavity pump. In yet another, the energy transfer mechanism is arranged to ensure a fixed ratio of fluid passes through the pump and the energy harvester. In another, the energy transfer mechanism comprises a torque transfer device.

Another exemplary methodology of the present invention provides a method of manufacturing a separator system for separating a mixture of a first fluid and a second fluid, the method comprising the steps of: (a) providing a separator comprising a separating chamber, an inlet, a first outlet for discharge of the first fluid from the separating chamber and a second outlet for discharge of the second fluid from the separating chamber; (b) providing a pump coupled to the inlet; (c) providing an energy harvester adapted to harvest pressure energy from the first fluid in the first outlet; and (d) providing an energy transfer mechanism adapted to transfer the harvested energy to the pump. In another, the separator is a cyclone separator. In yet another, the first fluid has a greater density than the second fluid. In another, the first fluid is water and the second fluid is oil.

In yet another exemplary methodology, it further comprises the step of arranging the energy harvester to convert pressure energy into mechanical energy. In another, the energy harvester comprises a progressive cavity motor. In yet another, the pump comprises a progressive cavity pump. In another, the energy transfer mechanism is arranged to ensure a fixed ratio of fluid passes through the pump and the energy harvester. In yet another, the energy transfer mechanism comprises a torque transfer device. In another, the method further comprises the step of providing a drive mechanism coupled to at least one of the pump, the energy harvester or the energy transfer mechanism.

Although various embodiments and methodologies have been shown and described, the invention is not limited to such embodiments and methodologies and will be understood to include all modifications and variations as would be apparent to one skilled in the art. Other variations and modifications will be apparent to the skilled person. Such variations and modifications may involve equivalent and other features which are already known and which may be used instead of, or in addition to, features described herein. Features that are described in the context of separate embodiments may be provided in combination in a single embodiment. Conversely, features which are described in the context of a single embodiment may also be provided separately or in any suitable sub-combination. Therefore, it should be understood that the invention is not intended to be limited to the particular forms disclosed. Rather, the intention is to cover all modifications, equivalents and alternatives falling within the spirit and scope of the invention as defined by the appended claims.

Moreover, it should be noted that the term "comprising" does not exclude other elements or steps, the term "a" or "an" does not exclude a plurality, a single feature may fulfill the functions of several features recited in the claims and reference signs in the claims, if used, shall not be construed as limiting the scope of the claims.

I claim:

1. A separator system for separating a mixture of a first fluid and a second fluid, comprising:
   a separator comprising a separating chamber, an inlet, a first outlet for discharge of the first fluid from the separating chamber and a second outlet for discharge of the second fluid from the separating chamber;
   a pump coupled to the inlet;
   an energy harvester coupled to the first outlet and adapted to harvest pressure energy from the first fluid in the first outlet; and
   an energy transfer mechanism coupled to the energy harvester and adapted to transfer the harvested energy to the pump wherein the energy transfer mechanism is arranged to ensure a fixed ratio of fluid passes through the pump and the energy harvester.

2. A separator system according to claim 1, wherein the separator is a cyclone separator.

3. A separator system according to claim 1, wherein the first fluid has a greater density than the second fluid.

4. A separator according to claim 3, wherein the first fluid is water and the second fluid is oil.

5. A separator system according to claim 1, wherein the energy harvester is arranged to convert pressure energy into mechanical energy.

6. A separator system according to claim 5, wherein the energy harvester comprises a progressive cavity motor.

7. A separator system according to claim 1, wherein the pump comprises a progressive cavity pump.

8. A separator system according to claim 1, wherein the energy transfer mechanism comprises a torque transfer device.

9. A separator system according to claim 1, further comprising a drive mechanism coupled to at least one of the pump, the energy harvester or the energy transfer mechanism.

10. A method of separating a mixture of a first fluid and a second fluid, the method comprising the steps of:
    (a) pumping the mixture into a separator using a pump;
    (b) separating the mixture of the first fluid and the second fluid in the separator;
    (c) discharging the first fluid through a first outlet of the separator;
    (d) discharging the second fluid through a second outlet of the separator;
    (e) harvesting pressure energy of the first fluid in the first outlet using an energy harvester; and (f) transferring the harvested energy to the pump using an energy transfer mechanism wherein the energy transfer mechanism is arranged to ensure a fixed ratio of fluid passes through the pump and the energy harvester.

11. A method according to claim 10, wherein the separator is a cyclone separator.

12. A method according to claim 10, wherein the first fluid has a greater density than the second fluid.

13. A method according to claim 12, wherein the first fluid is water and the second fluid is oil.

14. A method according to claim 10, wherein the energy harvester is arranged to convert pressure energy into mechanical energy.

15. A method according to claim 14, wherein the energy harvester comprises a progressive cavity motor.

16. A method according to claim 10, wherein the pump comprises a progressive cavity pump.

17. A method according to claim 10, wherein the energy transfer mechanism comprises a torque transfer device.

18. A method of manufacturing a separator system for separating a mixture of a first fluid and a second fluid, the method comprising the steps of:
   (a) providing a separator comprising a separating chamber, an inlet, a first outlet for discharge of the first fluid from the separating chamber and a second outlet for discharge of the second fluid from the separating chamber;
   (b) providing a pump coupled to the inlet;
   (c) providing an energy harvester coupled to the first outlet and adapted to harvest pressure energy from the first fluid in the first outlet; and
   (d) providing an energy transfer mechanism coupled to the energy harvester and adapted to transfer the harvested energy to the pump,
   wherein the energy transfer mechanism is arranged to ensure a fixed ratio of fluid passes through the pump and the energy harvester.

19. A method according to claim 18, wherein the separator is a cyclone separator.

20. A method according to claim 18, wherein the first fluid has a greater density than the second fluid.

21. A method according to claim 20, wherein the first fluid is water and the second fluid is oil.

22. A method according to claim 18, further comprising the step of arranging the energy harvester to convert pressure energy into mechanical energy.

23. A method according to claim 22, wherein the energy harvester comprises a progressive cavity motor.

24. A method according to claim 18, wherein the pump comprises a progressive cavity pump.

25. A method according to claim 18, wherein the energy transfer mechanism comprises a torque transfer device.

26. A method according to claim 18, further comprising the step of providing a drive mechanism coupled to at least one of the pump, the energy harvester or the energy transfer mechanism.

* * * * *